United States Patent Office 3,030,682
Patented Apr. 24, 1962

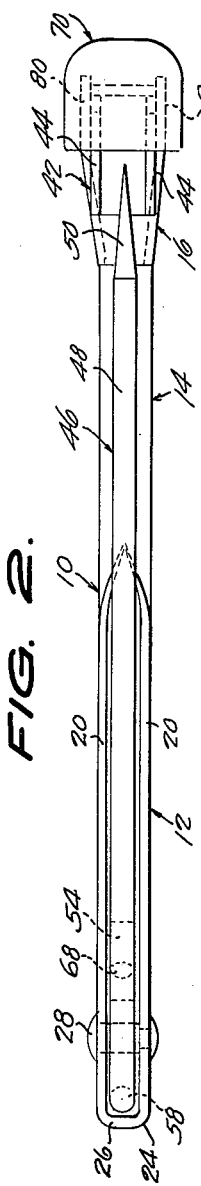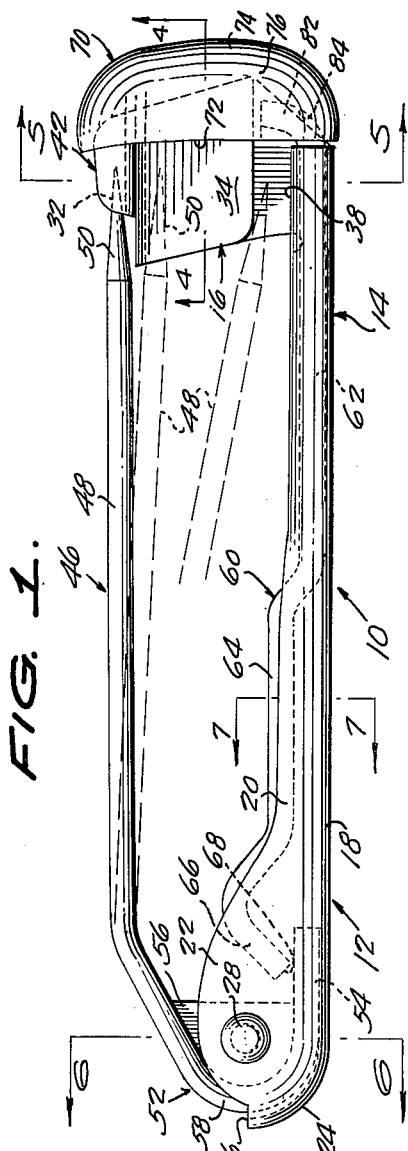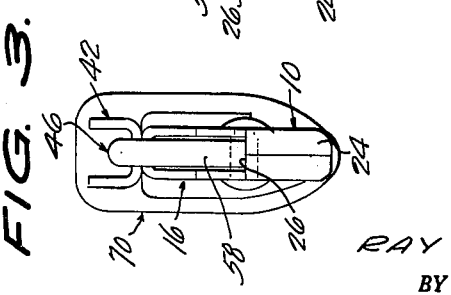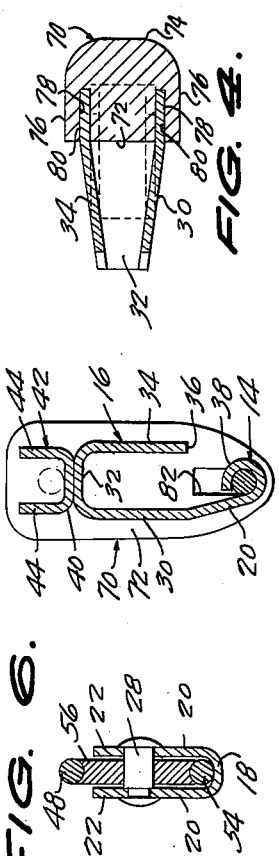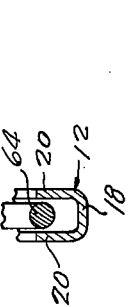
April 24, 1962 R. C. WILSON 3,030,682
SELF-CLOSING SAFETY PIN
Filed Dec. 22, 1960
INVENTOR.
RAY C. WILSON,
BY
McMorrow, Berman + Davidson
ATTORNEYS.

3,030,682
SELF-CLOSING SAFETY PIN
Ray C. Wilson, 20517 Eastwood, Harper Woods, Mich.
Filed Dec. 22, 1960, Ser. No. 77,647
5 Claims. (Cl. 24—161)

This invention relates to a novel and improved self-closing safety pin or the like.

The primary object of the invention is the provision of a more efficient, and mechanically superior device of the kind indicated, wherein the pin element is more reliably and strongly urged to closed position, by means of a spring bar.

Another object of the invention is the provision of a device of the character indicated above, wherein the point of the pin element is more effectively and protectively enclosed, when the pin element is in closed position.

A further object of the invention is the provision of an uncomplex device of the character indicated above, which is composed of a small number of simple and rugged and easily assembled parts, and which can be made in serviceable and well-finished forms at relatively low cost.

Other important objects and advantageous features of the invention will be apparent from the following description and the accompanying drawings, wherein, for purposes of illustration only, a specific form of the invention is set forth in detail.

In the drawings:

FIGURE 1 is a side elevation of a self-closing safety pin of the present invention;

FIGURE 2 is an edge elevation of the pin;

FIGURE 3 is a left-hand end elevation of the pin;

FIGURE 4 is a longitudinal section taken on the line 4—4 of FIGURE 1; and

FIGURES 5, 6 and 7 are transverse sections taken on the lines 5—5, 6—6 and 7—7, respectively, of FIGURE 1.

Referring in detail to the drawings, wherein like numerals designate like parts throughout the several views, the illustrated device comprises an elongated formed sheet material housing 10 having an open U-shaped rear end portion 12, a substantially closed tubular cylindrical forward end portion 14, and an inverted U-shaped guard portion 16 on the forward end portion 14, at the forward end thereof. The rear end portion 12, as shown in FIGURE 6, has a longitudinal bight portion 18 and parallel side walls 20 which flare rearwardly from the forward end portion 14 and have maximum width rear portions 22. The bight portion 18 is laterally curved, at its rear end, as indicated at 24, and has a terminal rear end 26, which is spaced below the outer edges of the maximum width side wall portions 22. A headed pivot pin 28 extends through and between the portions 22 and is centered relative to the curved bight portion 24.

Forwardly of the rear end portion 12, the side walls 20 of the housing 10 are formed arcuate and are pinched together, so as to produce the cylindrical forward end portions 14. At the forward end of the forward portion 14, a side wall 20 is extended laterally beyond the portion 14 and formed into an inverted U-shaped guard portion 16 having a first long leg 30 merging into a flat bight portion 32, spaced laterally from the portion 14, and merging into a short leg 34, which parallels the long leg 30 and has a free end 36 which is spaced laterally from the portion 14, so as to define a lateral entrance opening 38. As shown in FIGURE 5, the guard legs 30 and 34 are positioned laterally outwardly of the sides of the cylindrical forward end portion 14 of the housing 10.

Suitably secured upon the bight portion 32 of the guard portion 16, is the bight portion 40 of an erect U-shaped rest 42, which has parallel spaced legs 44.

The illustrated device further comprises a spring wire or rod pin element, generally designated 46, which is composed of an elongated straight main portion 48 having a point 50 on its forward end, and having a laterally and return bent portion 52 on its rear end, the bent portion 52 terminating in a short straight finger 54 which parallels the rod 48. A web 56 is suitably fixed to and extends across the bent portion 52 and is centrally journalled on the pivot pin 28. This arrangement, as shown in FIGURE 1, positions the finger 54 on the bight portion 18 of the rear end portion 12 of the housing 10 and the arcuate part 58 of the bent portion 52 against the curved bight portion 24, with the point 50 of the main portion 48 of the pin element 46 engaged in the rest 42.

The illustrated device further comprises a spring bar 60 for retracting and closing the pin element 46, the bar 60 having a straight forward end portion 62 which is enclosed within and secured to the cylindrical forward end portion 14 of the housing 10, and a straight laterally offset rear end portion 64 which terminates, at its rear end, in a laterally inwardly and rearwardly angled terminal 66, whose free end 68 is positioned close to and can bear directly against the adjacent side of the finger 54, whereby the pin element 46 is yieldably urged toward closed position, with its point 50 engaged on the rest 42, as shown in full lines in FIGURE 1.

Mounted on the guard 16 is a preferably solid plastic or other composition head 70 which has a flat rear surface 72 and rounded rear surface 74, and flat sides 76. The head 70 is only slightly wider than the guard 16, and has parallel grooves 78 in its flat rear surface 72 in which are securably engaged triangular extensions 80 on the guard legs 30 and 34. The head 70 serves as a closure for the forward end of the guard 16. The head 70 is further mounted on the housing 10 by means of a lateral hook 82, on the forward end of the spring bar 60, which is securably engaged in a conformably shaped socket 84 in the rear surface 72 of the head.

From the foregoing it will be understood that when the device is not in use, the pin element 46 is kept closed by the spring bar 60, with its point 50 engaged in the rest 42. When the device is to be applied to pin fabric (not shown) the main portion 48 of the pin element is forced laterally so as to move its point 50 out of the rest 42, against the resistance of the spring bar 60, and then forced sidewise and then along the outer side of the short leg 34 of the guard 16 until the entrance opening 38 is reached, the main portion of the pin element having been passed through the fabric to be pinned. The point 50 is then pushed through the entrance openings 38, and the pin element is released, so that its point 50 is sprung into engagement with the bight portion 32 of the guard 16, as shown in phantom lines in FIGURE 1.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. A self-closing safety pin comprising an elongated housing having a rear end and a forward end, a spring pin element having a straight main portion terminating at its forward end in a point, said main portion having a lateral return bend on its rear end, said main portion being spaced laterally from and extending along said housing with said bend directed toward the housing, means pivoting said bend on the housing at the rear end of the housing, said bend terminating in a forwardly extending finger positioned in its housing, a spring bar extended along and having a forward end portion secured to the housing at the forward end of the housing, said spring bar having a rear end portion unsecured to the housing and having a lateral terminal bearing against said finger within said bend, said housing having a lateral rest on its forward end in which the point of the main portion of the pin element is forcibly engaged, a web extending across and fixed to said bend, said rear end portion of the housing being U-shaped and having spaced side walls between which said web is positioned, said pivot means consisting of a pivot pin extending through the side walls and the web, said rear end portion of the housing having a bight portion against which said finger bears when the point of said pin element is engaged with the rest.

2. A self-closing safety pin comprising an elongated housing having a rear end and a forward end, a spring pin element having a straight main portion terminating at its forward end in a point, said main portion having a lateral return bend on its rear end, said main portion being spaced laterally from and extending along said housing with said bend directed toward the housing, means pivoting said bend on the housing at the rear end of the housing, said bend terminating in a forwardly extending finger positioned in its housing, a spring bar extending along and having a forward end portion secured to the housing at the forward end of the housing, said spring bar having a rear end portion unsecured to the housing and having a lateral terminal bearing against said finger within said bend, said housing having a lateral rest on its forward end in which the point of the main portion of the pin element is forcibly engaged, a web extending across and fixed to said bend, said rear end portion of the housing being U-shaped and having spaced side walls between which said web is positioned, said pivot means consisting of a pivot pin extending through the side walls and the web, said rear end portion of the housing having a bight portion against which said finger bears when the point of said pin element is engaged with the rest, said forward end portion of the housing being cylindrical and having arcuate side walls, and a U-shaped point guard having a long leg as an extension of a side wall of said forward end portion, a bight portion, and a short leg extending toward and terminating in spaced relation to said forward end portion so as to define a point entrance opening.

3. A self-closing safety pin comprising an elongated housing having a rear end and a forward end, a spring pin element having a straight main portion terminating at its forward end in a point, said main portion having a lateral return bend on its rear end, said main portion being spaced laterally from and extending along said housing with said bend directed toward the housing, means pivoting said bend on the housing at the rear end of the housing, said bend terminating in a forwardly extending finger positioned in its housing, a spring bar extending along and having a forward end portion secured to the housing at the forward end of the housing, said spring bar having a rear end portion unsecured to the housing and having a lateral terminal bearing against said finger within said bend, said housing having a lateral rest on its forward end in which the point of the main portion of the pin element is forcibly engaged, a web extending across and fixed to said bend, said rear end portion of the housing being U-shaped and having spaced side walls between which said web is positioned, said pivot means consisting of a pivot pin extending through the side walls and the web, said rear end portion of the housing having a bight portion against which said finger bears when the point of said pin element is engaged with the rest, said forward end portion of the housing being cylindrical and having arcuate side walls, and a U-shaped point guard having a long leg as an extension of a side wall of said forward end portion, a bight portion, and a short leg extending toward and terminating in spaced relation to said forward end portion so as to define a point entrance opening, said lateral rest being U-shaped and having its bight portion secured upon the bight portion of the guard.

4. A self-closing safety pin comprising an elongated housing having a rear end and a forward end, a spring pin element having a straight main portion terminating at its forward end in a point, said main portion having a lateral return bend on its rear end, said main portion being spaced laterally from and extending along said housing with said bend directed toward the housing, means pivoting said bend on the housing at the rear end of the housing, said bend terminating in a forwardly extending finger positioned in its housing, a spring bar extending along and having a forward end portion secured to the housing at the forward end of the housing, said spring bar having a rear end portion unsecured to the housing and having a lateral terminal bearing against said finger within said bend, said housing having a lateral rest on its forward end in which the point of the main portion of the pin element is forcibly engaged, a web extending across and fixed to said bend, said rear end portion of the housing being U-shaped and having spaced side walls between which said web is positioned, said pivot means consisting of a pivot pin extending through the side walls and the web, said rear end portion of the housing having a bight portion against which said finger bears when the point of said pin element is engaged with the rest, said forward end portion of the housing being cylindrical and having arcuate side walls, and a U-shaped point guard having a long leg as an extension of a side wall of said forward end portion, a bight portion, and a short leg extending toward and terminating in spaced relation to said forward end portion so as to define a point entrance opening, and a head secured to the forward edges of the legs of the guard and extending between the legs, said head extending between said rest and the forward end portion of the housing.

5. A self-closing safety pin comprising an elongated housing having a rear end and a forward end, a spring pin element having a straight main portion terminating at its forward end in a point, said main portion having a lateral return bend on its rear end, said main portion being spaced laterally from and extending along said housing with said bend directed toward the housing, means pivoting said bend on the housing at the rear end of the housing, said bend terminating in a forwardly extending finger positioned in its housing, a spring bar extending along and having a forward end portion secured to the housing at the forward end of the housing, said spring bar having a rear end portion unsecured to the housing and having a lateral terminal bearing against said finger within said bend, said housing having a lateral rest on its forward end in which the point of the main portion of the pin element is forcibly engaged, a web extending across and fixed to said bend, said rear end portion of the housing being U-shaped and having spaced side walls between which said web is positioned, said pivot means consisting of a pivot pin extending through the side walls and the web, said rear end portion of the housing having a bight portion against which said finger bears when the point of said pin element is engaged with the rest, said forward end portion of the housing being cylindrical and having arcuate side walls, and a U-shaped point guard having a long leg as an extension of a side wall of said forward end portion, a bight portion, and a short leg extending toward and terminating in spaced relation to said forward end portion so as to define a point entrance opening, and a head secured to the forward edges of the legs of the guard and extending between the legs, said head extending between said rest and the forward end portion of the housing, said forward end portion of the spring bar terminating in a hook secured to the head.

References Cited in the file of this patent

UNITED STATES PATENTS

| | | |
|---|---|---|
| 706,168 | Dover | Aug. 5, 1902 |
| 1,884,525 | Bautista | Oct. 25, 1932 |
| 2,625,724 | Sampson | Jan. 20, 1953 |